United States Patent
Oshima

(10) Patent No.: US 11,765,282 B2
(45) Date of Patent: Sep. 19, 2023

(54) DATA COLLECTION APPARATUS AND NON-TRANSITORY COMPUTER READABLE MEDIUM FOR PRIORITIZING CONNECTION OF TERMINAL APPARATUSES

(71) Applicant: FUJIFILM BUSINESS INNOVATION CORP., Tokyo (JP)

(72) Inventor: Akihide Oshima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 788 days.

(21) Appl. No.: 16/594,500

(22) Filed: Oct. 7, 2019

(65) Prior Publication Data

US 2020/0322491 A1   Oct. 8, 2020

(30) Foreign Application Priority Data

Apr. 2, 2019   (JP) .................................. 2019-070838

(51) Int. Cl.
*H04N 1/00*  (2006.01)
*H04L 67/12*  (2022.01)
*H04L 67/50*  (2022.01)

(52) U.S. Cl.
CPC ......... *H04N 1/00206* (2013.01); *H04L 67/12* (2013.01); *H04L 67/535* (2022.05);
(Continued)

(58) Field of Classification Search
CPC ........... H04N 1/00206; H04N 1/00209; H04N 1/00347; H04N 1/00915; H04N 2201/0087; H04N 2201/0096
See application file for complete search history.

(56) References Cited

U.S. PATENT DOCUMENTS

2016/0352916 A1\* 12/2016 Yoshimura ............ H04L 67/143
2019/0012123 A1\*  1/2019 Takahashi ............. G06F 3/1238
(Continued)

FOREIGN PATENT DOCUMENTS

| JP | 2010-152815 A | 7/2010 |
|----|---------------|--------|
| JP | 2012-070158 A | 4/2012 |
| JP | 2017-102627 A | 6/2017 |

OTHER PUBLICATIONS

Feb. 7, 2023 Office Action issued in Japanese Patent Application No. 2019-070838.

*Primary Examiner* — Nicholas Pachol
(74) *Attorney, Agent, or Firm* — Oliff PLC

(57) ABSTRACT

A data collection apparatus includes a connecting unit, a storing unit, and a controller. The connecting unit is able to be connected through communication with a limited number of terminal apparatuses. The storing unit stores priority levels regarding connection with the terminal apparatuses. The controller allows, in a case where the number of terminal apparatuses that are present in a region in which the data collection apparatus is able to be connected through communication with a terminal apparatus via the connecting unit is larger than the limited number, a terminal apparatus that is not connected through communication with the connecting unit and has a higher priority level to be connected with the connecting unit, in place of a terminal apparatus that has already been connected through communication with the connecting unit and has a lower priority level, in accordance with the stored priority levels.

20 Claims, 9 Drawing Sheets

(52) U.S. Cl.
CPC ..... *H04N 1/00209* (2013.01); *H04N 1/00347* (2013.01); *H04N 1/00915* (2013.01); *H04N 2201/0087* (2013.01); *H04N 2201/0096* (2013.01)

(56) References Cited

U.S. PATENT DOCUMENTS

| | | | |
|---|---|---|---|
| 2019/0306067 A1* | 10/2019 | Suraparaju | H04L 69/161 |
| 2019/0364159 A1* | 11/2019 | Saeda | H04N 1/346 |

* cited by examiner

FIG. 5

| IDENTIFICATION ID | PRIORITY LEVEL | = | TYPE | × | COMMUNICATION FREQUENCY | × | DATA SIZE | × | ROLE | × | × | PURPOSE OF USE |
|---|---|---|---|---|---|---|---|---|---|---|---|---|
| ID0001 | 375 | | 5 | | 5 | | 3 | | 1 | | 1 | 5 |
| ID0100 | 360 | | 2 | | 5 | | 1 | | 3 | 3 | | 4 |
| ID0002 | 240 | | 4 | | 4 | | 3 | | 1 | | 1 | 5 |
| ID0003 | 18 | | 2 | | 3 | | 1 | | 1 | | 1 | 3 |
| ID0004 | 18 | | 2 | | 3 | | 1 | | 1 | | 1 | 3 |
| ID0005 | 18 | | 2 | | 3 | | 1 | | 1 | | 1 | 3 |
| ID0006 | 18 | | 2 | | 3 | | 1 | | 1 | | 1 | 3 |
| ID0007 | 4 | | 1 | | 2 | | 1 | | 1 | | 1 | 2 |
| ID0008 | 4 | | 1 | | 2 | | 1 | | 1 | | 1 | 2 |

FIG. 6

| | APPARATUS TYPE | | COMMUNICATION FREQUENCY | | DATA SIZE | | LEVEL ACCORDING TO ROLE | | SERVICE | | LEVEL ACCORDING TO PURPOSE OF USE |
|---|---|---|---|---|---|---|---|---|---|---|---|
| 5 | DETECT EMERGENCY, HAZARD, OR MALFUNCTION | 5 | 1 SECOND | 5 | Big | 5 | PERSON TO BE MONITORED IN DETAIL | 3 | PRINT/FAX RECEPTION | 5 | DETECT ABNORMALITY, DETECT ACCIDENT, ETC. (CONTINUOUS MONITORING IS REQUIRED) |
| 4 | DETECT MOVEMENT | 4 | 1 MINUTE | 3 | Middle | 4 | DIRECTOR | 2 | COPY | 4 | PROVIDE SERVICE, NOTIFY INFORMATION, ETC. (DETAILED MONITORING FOR SHORT PERIOD IS REQUIRED) |
| 3 | MONITOR OPERATING STATE | 3 | 1 HOUR | 1 | Little | 3 | MANAGER | 1 | SCAN | 3 | (PERIODIC MONITORING AT NORMAL LEVEL IS REQUIRED) |
| 2 | ACTIVITY METER | 2 | 1 DAY | | | 2 | STAFF MEMBER | | | 2 | (PERIODIC MONITORING AT LOW FREQUENCY IS REQUIRED) |
| 1 | ILLUMINOMETER, THERMOMETER, OR OTHER SENSORS | 1 | 1 WEEK | | | 1 | GUEST/NONE | | | 1 | (MONITORING MAY BE TEMPORARILY INTERRUPTED) |

32

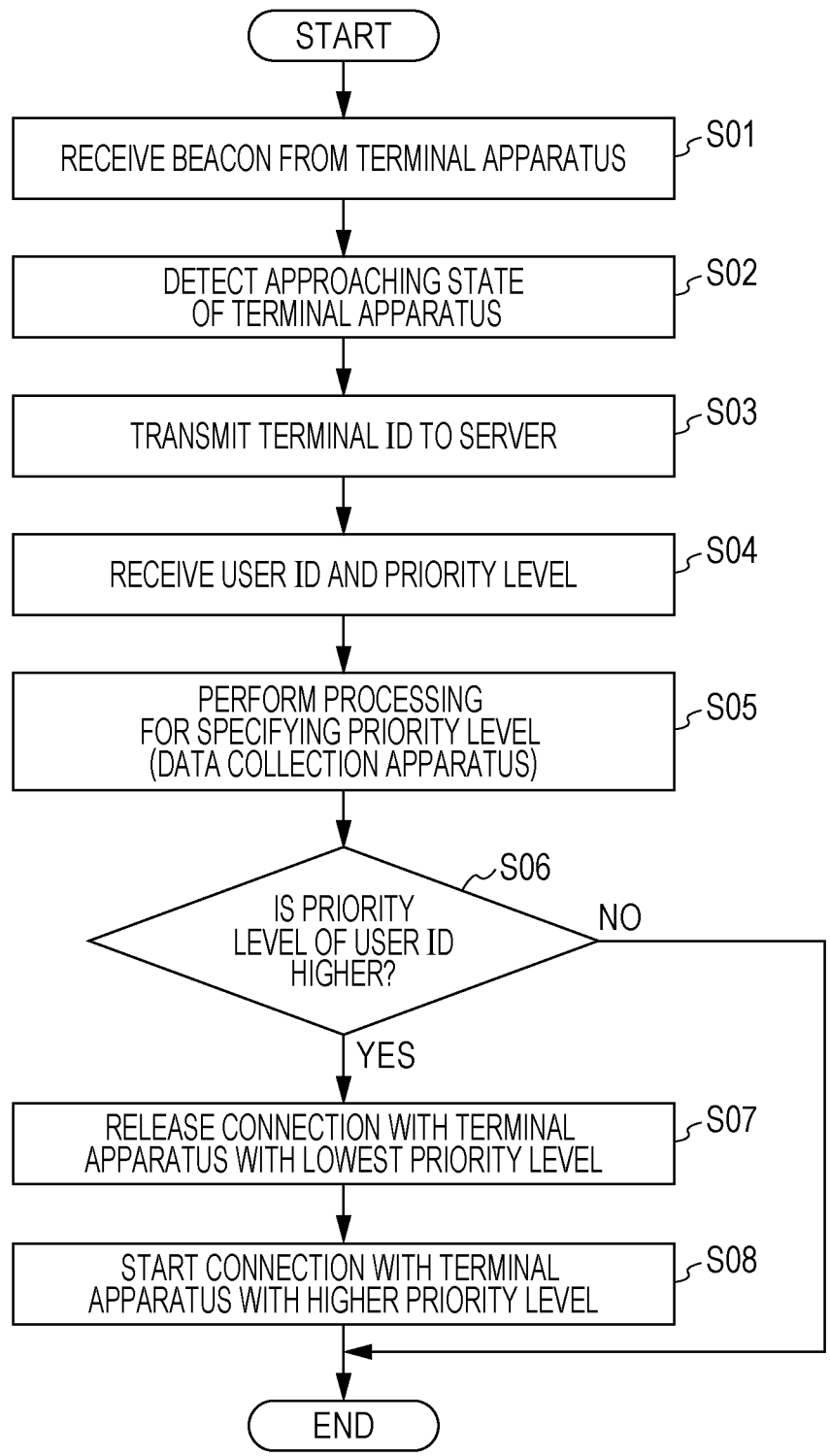

DATA COLLECTION APPARATUS AND NON-TRANSITORY COMPUTER READABLE MEDIUM FOR PRIORITIZING CONNECTION OF TERMINAL APPARATUSES

CROSS-REFERENCE TO RELATED APPLICATIONS

This application is based on and claims priority under 35 USC 119 from Japanese Patent Application No. 2019-070838 filed Apr. 2, 2019.

BACKGROUND

(i) Technical Field

The present disclosure relates to a data collection apparatus and a non-transitory computer readable medium.

(ii) Related Art

In Internet of Things (IoT) networks using a short-range wireless communication technique that transmit data from an IoT device to a server connected to the Internet via an apparatus such as a mobile phone terminal or a wireless gateway, an IoT information communication system in which a data relay apparatus such as a mobile phone terminal or a wireless gateway relays, using software gateway provided in the data relay apparatus, all the data received from the IoT device to the server for the Internet, has been suggested in Japanese Unexamined Patent Application Publication No. 2017-102627.

SUMMARY

IoT networks in which data acquired by various IoT devices are relayed at an edge device (data collection apparatus) and collected at a server on the Internet have been suggested. The number of terminal apparatuses that are able to be connected to the edge device at the same time is limited. Thus, in the case where the number of terminal apparatuses that are connected to the edge device has reached the upper limit, even if a non-connected terminal apparatus that transmits data that is desired to be collected more preferentially than those transmitted from the connected terminal apparatuses approaches the edge device, only data from the connected terminal apparatuses are able to be acquired.

Aspects of non-limiting embodiments of the present disclosure relate to providing a data collection apparatus that is able to cope with connection with an additional terminal apparatus more flexibly than a configuration in which connection with an additional terminal apparatus is not established in the case where the number of terminal apparatuses that are able to be connected with the data collection apparatus has reached an upper limit.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a data collection apparatus including a connecting unit, a storing unit, and a controller. The connecting unit is able to be connected through communication with a limited number of terminal apparatuses. The storing unit stores priority levels regarding connection with the terminal apparatuses. The controller allows, in a case where the number of terminal apparatuses that are present in a region in which the data collection apparatus is able to be connected through communication with a terminal apparatus via the connecting unit is larger than the limited number, a terminal apparatus that is not connected through communication with the connecting unit and has a higher priority level to be connected with the connecting unit, in place of a terminal apparatus that has already been connected through communication with the connecting unit and has a lower priority level, in accordance with the stored priority levels.

BRIEF DESCRIPTION OF THE DRAWINGS

Exemplary embodiments of the present disclosure will be described in detail based on the following figures, wherein:

FIG. 5 illustrates an example of a priority level determination table used in data collection apparatuses according to first and second exemplary embodiments of the present disclosure;

FIG. 6 is a table illustrating an example of assignment of priority level in the data collection apparatuses according to the first and second exemplary embodiments of the present disclosure;

FIG. 7 is a flowchart illustrating an example of a control operation of the data collection apparatus according to the first exemplary embodiment of the present disclosure;

DETAILED DESCRIPTION

Figure 1:
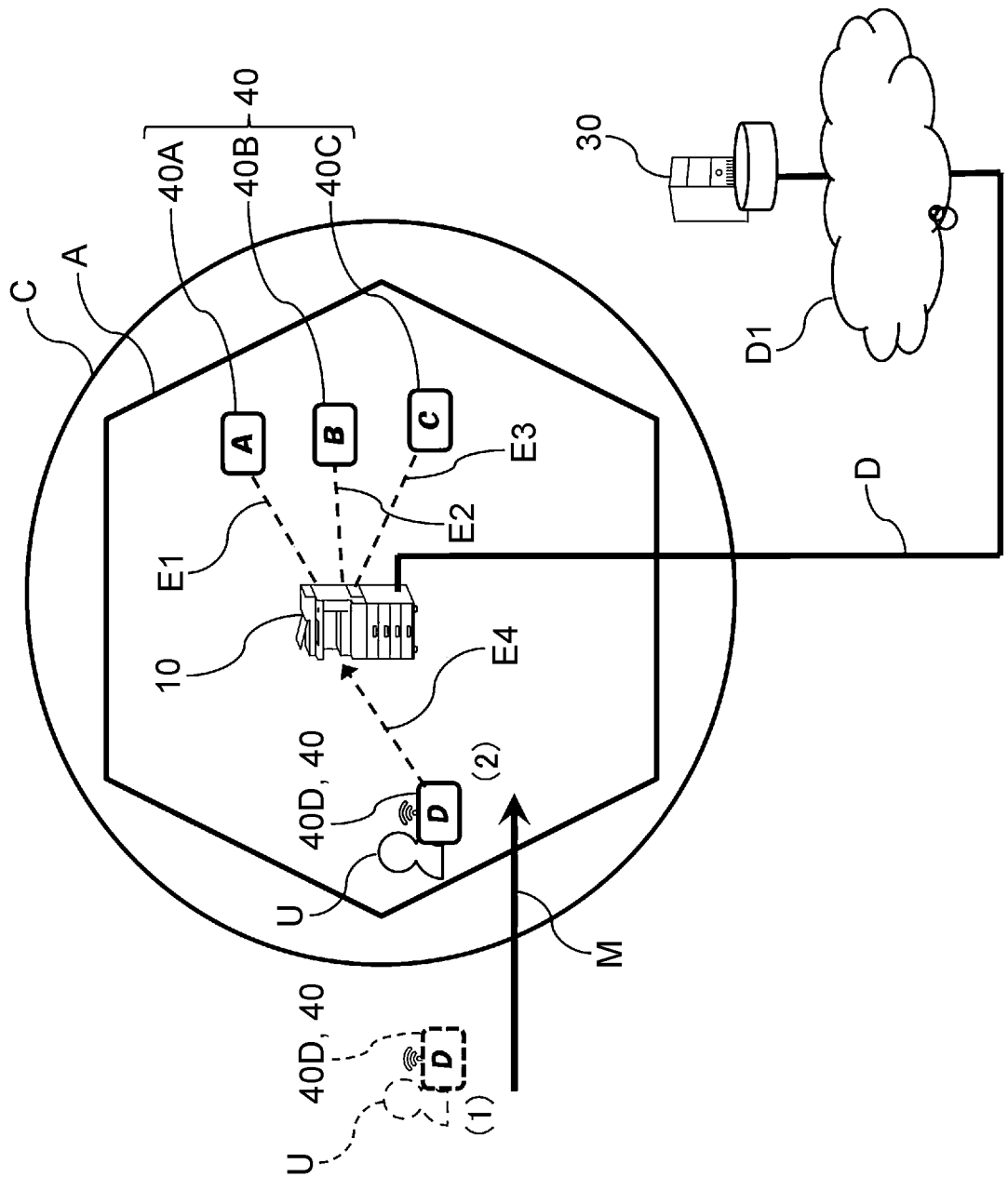
FIG. 1 is a schematic diagram illustrating the entire configuration including a data collection apparatus according to a first exemplary embodiment of the present disclosure.

Hereinafter, exemplary embodiments of the present disclosure will be described with reference to drawings. In the drawings, the same or equivalent components and parts are denoted by the same reference signs. Dimension ratios in the drawings are exaggerated for the sake of explanation and may be different from actual ratios.

First Exemplary Embodiment

FIG. 1 is a diagram illustrating the entire configuration of a data collection apparatus 10 according to a first exemplary embodiment of the present disclosure.

[Entire Configuration]

As illustrated in FIG. 1, a data collection system includes the data collection apparatus 10, a server 30, and a plurality of terminal apparatuses 40. The data collection apparatus 10 is installed within the range of an area A in which the data collection apparatus 10 is able to be connected through communication with the terminal apparatuses 40, which will be described later. Each of the terminal apparatuses 40 is carried by a corresponding user U and is connected with the data collection apparatus 10 in accordance with movement of the user U (represented by an arrow M). The area A is an example of a region in which connection through communication with a terminal apparatus is possible, and the user U is an example of a user.

[Configuration of Data Collection Apparatus]

Figure 2:
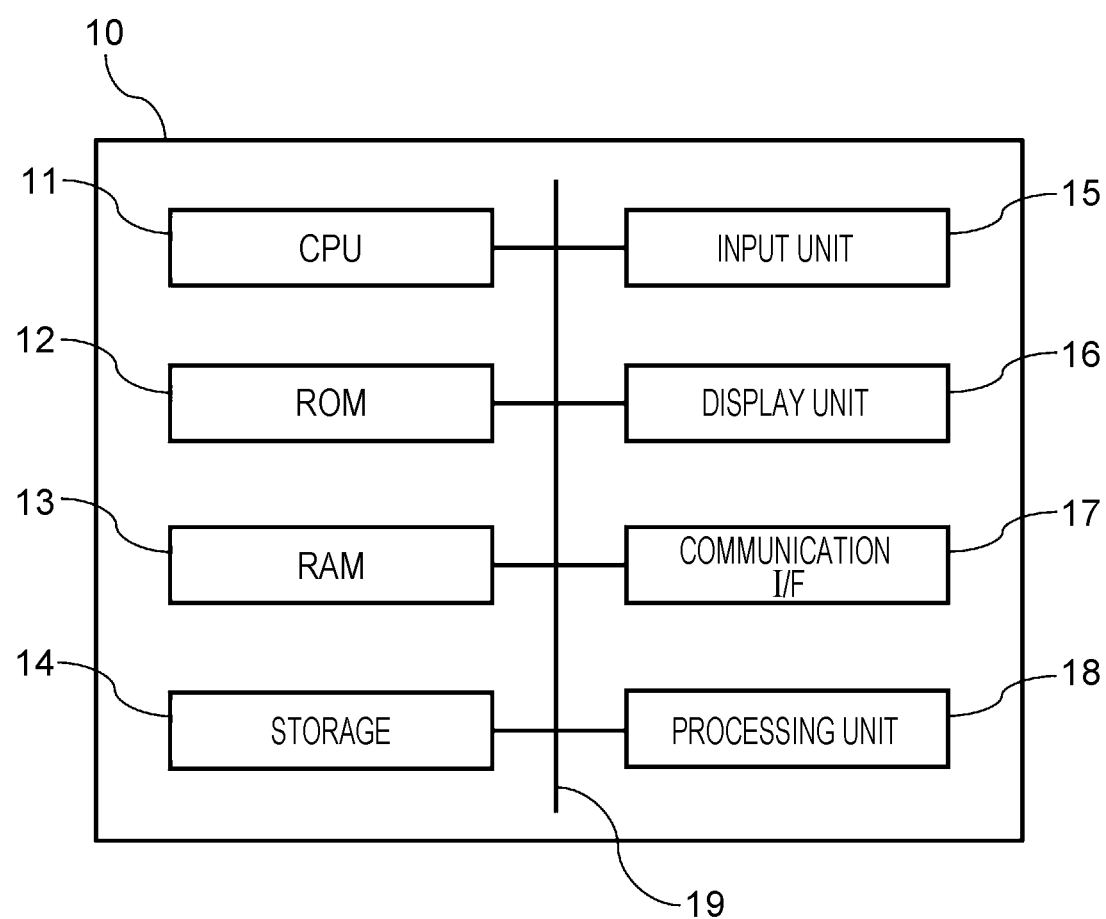
FIG. 2 is a block diagram illustrating a hardware configuration of the data collection apparatus according to the first exemplary embodiment of the present disclosure.

FIG. 2 is a block diagram illustrating a hardware configuration of the data collection apparatus 10. As illustrated in FIG. 2, the data collection apparatus 10 includes a central processing unit (CPU) 11, a read only memory (ROM) 12, a random access memory (RAM) 13, a storage 14, an input unit 15, a display unit 16, a communication interface (I/F) 17, and a processing unit 18. These components are connected via a bus 19 so that they communicate with one another.

The CPU 11 is a central processing unit that executes various programs and controls units of the data collection apparatus 10. That is, the CPU 11 reads a program from the ROM 12 or the storage 14 and executes the program using the RAM 13 as an operation region. The CPU 11 controls the components mentioned above and performs various types of arithmetic processing in accordance with the program stored in the ROM 12 or the storage 14.

In this exemplary embodiment, a program for identifying priority levels of the terminal apparatuses 40, which will be described later, and executing a process in the data collection apparatus 10 in accordance with the identified priority levels is stored in the ROM 12 or the storage 14. Furthermore, information regarding the priority levels may be stored in the ROM 12 or the storage 14, Various programs and various data are stored in the ROM 12. The RAM 13, as an operation region, temporarily stores a program or data. The storage 14 is implemented by a hard disk drive (HDD) or a solid state drive (SSD) and stores various programs including an operating system and various data.

The input unit 15 includes hard keys and the like and is used for providing various inputs.

The display unit 16 is, for example, a liquid crystal display and displays various types of information. The display unit 16 may adopt a touch panel system to function as the input unit 15.

The communication interface 17 is an interface that allows communication with other apparatuses such as client terminals or other servers. For example, standards such as Ethernet®, FDDI, or Wi-Fi® may be used for the communication interface 17.

The processing unit 18 has a function for performing a process in accordance with a processing request to the data collection apparatus 10. The data collection apparatus 10 may perform any type of processing. For example, in the case where the data collection apparatus 10 is a database, the processing unit 18 performs a process for storing data and a process for transmitting data, in accordance with a processing request from a user U. Furthermore, in the case where the data collection apparatus 10 is an image forming apparatus, the processing unit 18 performs image processing for forming an image on a recording medium such as paper, in accordance with an image processing job (hereinafter, will be referred to as a print job) from a user U. Furthermore, in accordance with a processing request, a process may be performed immediately, or a process may be reserved by a user U such that the process will be performed at a timing required by the user U.

Figure 3:
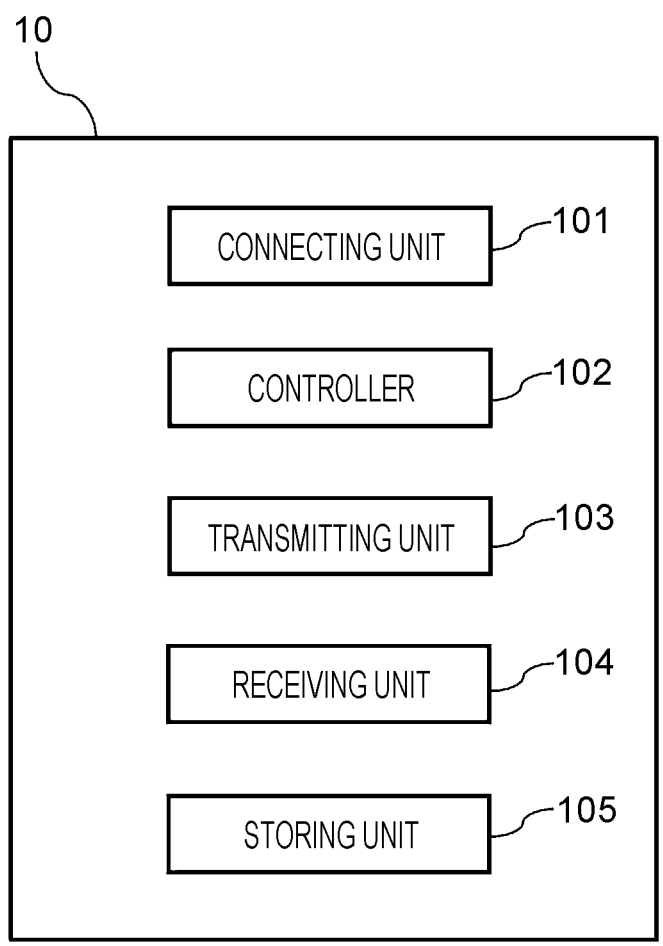
FIG. 3 is a block diagram illustrating a functional configuration of the data collection apparatus according to the first exemplary embodiment of the present disclosure.

FIG. 3 is a block diagram illustrating a functional configuration of the data collection apparatus 10. As illustrated in FIG. 3, the data collection apparatus 10 includes a connecting unit 101, a controller 102, a transmitting unit 103, a receiving unit 104, and a storing unit 105.

The connecting unit 101 has a function for connecting the data collection apparatus 10 with the terminal apparatuses 40 through communication.

The controller 102 has a function for identifying and acquiring the priority level of each of the terminal apparatuses 40, based on information regarding the corresponding user U stored in the server 30.

The transmitting unit 103 has a function for transmitting data acquired from each of the terminal apparatuses 40 to the server 30 installed outside the range of the area A.

The receiving unit 104 has a function for receiving information regarding the user U identified by the server 30.

The storing unit 105 has a function for storing priority level regarding connection with each of the terminal apparatuses 40.

As described above, the data collection apparatus 10 includes the connecting unit 101, which is able to be connected through communication with a limited number of terminal apparatuses 40, the storing unit 105, which stores priority level regarding connection with each of the terminal apparatuses 40, and the controller 102, which allows a terminal apparatus 40 with a higher priority level that is not connected through communication with the connecting unit 101 to be connected with the connecting unit 101, instead of a terminal apparatus 40 with a lower priority level that has already been connected through communication with the connecting unit 101, in accordance with the stored priority levels, in a case where the number of terminal apparatuses that are present within the region A in which the data collection apparatus 10 is able to be connected through communication with terminal apparatuses via the connecting unit 101 is larger than the limited number. In other words, communication with the terminal apparatuses 40 is established via the connecting unit 101.

Furthermore, the data collection apparatus 10 further includes the transmitting unit 103, which transmits to the external server 30 data acquired from the terminal apparatus 40 that is connected with the data collection apparatus 10 via the connecting unit 101.

Furthermore, the controller 102 acquires the priority level of each of the terminal apparatuses 40 by asking the server 30 about the priority level of the terminal apparatus 40.

In this exemplary embodiment, as illustrated in FIG. 1, for example, the data collection apparatus 10 is installed within the range of the area A included in a region C where communication radio waves are able to reach, connection through communication being able to be established within the area A, and is connected with the server 30, which is installed outside the range of the region C, via a communication medium D. The communication medium D may be a wired system within a premises or may be the Internet D1.

Furthermore, the data collection apparatus 10 is an apparatus that performs processing corresponding to the user U who carries the terminal apparatus 40D and includes a function for being connected with the plurality of terminal apparatuses 40 at the same time. In this exemplary embodiment, for example, the three terminal apparatuses 40A, 40B, and 40C are connected with the data collection apparatus 10 at the same time. In FIG. 1, the terminal apparatus 40D carried by the user U is not connected through communication with the data collection apparatus 10 at this point in time.

Furthermore, for example, the data collection apparatus 10 may be an apparatus that performs predetermined processing to the user U, such as an automatic payment machine in hospitals or the like, and provides processing different from data collection processing. The data collection apparatus 10 performs a process according to a processing request directly input by the user U into the input unit 15 of the data collection apparatus 10 or performs a process according to a processing request input by the user U into a user terminal such as the terminal apparatus 40 or the like that is located in a place away from the data collection apparatus 10. Furthermore, the terminal apparatus 40 may be any type of apparatus as long as it transmits an ID of the apparatus, such as an electronic medical examination receiver lent to the user U in a hospital or the like, a portable terminal, an IoT, or the like.

[Operation and Effect of Data Collection Apparatus]

Figure 4:
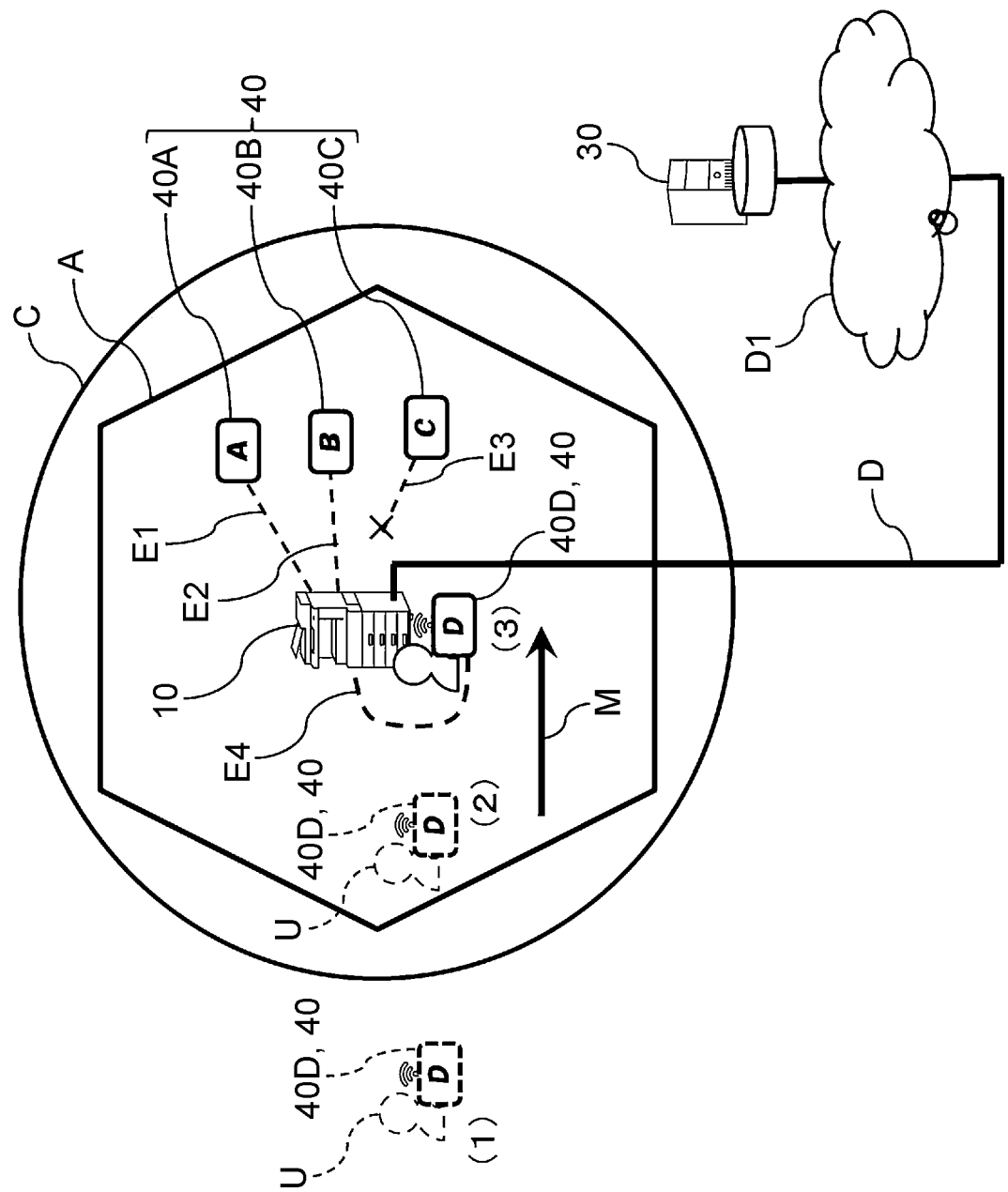
FIG. 4 is a schematic diagram illustrating a state in which connection with a terminal apparatus with a lower priority level is released and connection with a terminal apparatus with a higher priority level is instead established in the data collection apparatus according to the first exemplary embodiment of the present disclosure.

Operations of the data collection apparatus 10 according to this exemplary embodiment will be described below with reference to FIG. 1 and FIGS. 4 to 7. FIG. 4 is a schematic diagram illustrating a state in which connection with a terminal apparatus with a lower priority level is released and connection with a terminal apparatus with a higher priority level is instead established in the data collection apparatus 10 according to the first exemplary embodiment of the present disclosure. FIG. 5 illustrates an example of a priority level determination table used in the data collection apparatuses according to the first and second exemplary embodiments of the present disclosure. FIG. 6 is a table illustrating an example of assignment of priority level in the data collection apparatuses according to the first and second exemplary embodiments of the present disclosure. FIG. 7 is a flowchart illustrating an example of a control operation of the data collection apparatus according to the first exemplary embodiment of the present disclosure. When the CPU 11 reads a data collection program from the ROM 12 or the storage 14, loads the data collection program onto the RAM 13, and executes the data collection program, the data collection process is performed.

As illustrated in FIGS. 1 and 7, the data collection apparatus 10 is installed within the range of the area A. The user U who is carrying the terminal apparatus 40D moves into the range of the area A in a direction represented by an arrow M from a position (1) outside the area A. At this time, the terminal apparatus 40D transmits a terminal ID through a beacon E4.

When the user U reaches a position (2) within the range of the area A, the data collection apparatus 10 receives the beacon E4 transmitted from the terminal apparatus 40D (step S01).

At this point in time, the data collection apparatus 10 detects a change in the radio wave intensity of the beacon E4, that is, detects a gradual increase in the radio wave intensity, and thus detects an approaching state of the terminal apparatus 40D. In this state, the three terminal apparatuses 40A, 40B, and 40C are connected with the connecting unit 101 of the data collection apparatus 10. In this exemplary embodiment, for example, the number of terminal apparatuses 40 that are able to be connected with the data collection apparatus 10 is set in advance to three. That is, the data collection apparatus 10 detects that the terminal apparatus 40D is in the approaching state, which is beyond the upper limit of the number of apparatuses that are able to be connected with the data collection apparatus 10 (step S02).

Then, to determine the priority level of the terminal apparatus 40 in the approaching state, the data collection apparatus 10 transmits the terminal ID transmitted from the terminal apparatus 40 to the server 30 (step S03). Steps 01 to 03 are examples of communication steps.

A database, which is not illustrated in FIG. 1, in which the terminal IDs of the terminal apparatuses 40 and the user IDs of the users U are stored in association with each other, is stored in the server 30, and the server 30 identifies the user ID of the user U based on the received terminal ID. Furthermore, in this exemplary embodiment, for example, the server 30 includes a priority level determination table 31 illustrated in FIG. 5 and a priority level assignment table 32 illustrated in FIG. 6. The server 30 identifies the priority level of the user U, based on a priority level coefficient weighted on the user U stored in the priority level assignment table (see FIG. 6), according to a value obtained by multiplication of each priority level coefficient in the priority level determination table 31 (see FIG. 5). In this exemplary embodiment, in FIGS. 5 and 6, information in service fields shaded with dots is not used. Priority level coefficients set in the priority level assignment table 32 may be changed dynamically.

The data collection apparatus 10 receives the priority level, along with the user ID of the user U, from the server 30 and stores the received user ID and the priority level into the storage 14 (step S04). The priority level is transmitted, as the value of the priority level (hereinafter, may be simply referred to as a "priority level") calculated in the server 30, in association with the user ID. Step S04 is an example of a storing step.

The data collection apparatus 10 identifies the priority level of the user U of the terminal apparatus 40D that has transmitted the beacon received by the receiving unit 104 and the priority levels associated with the user IDs of the users U associated with the terminal apparatuses 40A, 40B, and 40C that are connected with the data collection apparatus 10 at the point in time (step S05). The priority levels associated with the user IDs of the users U associated with the terminal apparatuses 40A, 40B, and 40C connected with the data collection apparatus 10 are stored in advance in the storage 14. The data collection apparatus 10 reads the priority levels of the users U of the terminal apparatuses 40A, 40B, and 40C that are connected with the data collection apparatus 10 from the storage 14 to identify the priority levels of the users U of the terminal apparatuses 40A, 40B, and 40C.

The data collection apparatus 10 compares the priority level of the user U of the terminal apparatus 40D with the priority levels of the users of the terminal apparatuses 40A, 40B, and 40C and determines whether or not the priority level of the user U received by the receiving unit 104 is higher than the priority levels of the users of the terminal apparatuses 40A, 40B, and 40C (step S06).

In the case where the priority level of the user U of the terminal apparatus 40D is lower than all the priority levels of the users of the terminal apparatuses 40A, 40B, and 40C that are connected with the data collection apparatus 10 (step S06: NO), the data collection apparatus 10 does not establish connection with the terminal apparatus 40D, and the data collection process ends.

In contrast, in the case where the priority level of the user U of the terminal apparatus 40D is equal to or higher than any one of the priority levels of the users of the terminal apparatuses 40A, 40B, and 40C that are connected with the data collection apparatus 10 (step S06: YES), the data collection apparatus 10 proceeds to step S07.

The data collection apparatus 10 releases connection with the terminal apparatus of the user U with the lowest priority level among the users U associated with the terminal apparatuses 40A, 40B, and 40C (step S07). In this exemplary embodiment, for example, the priority level of the user of the terminal apparatus 40C is the lowest. Therefore, the data collection apparatus 10 releases connection with the terminal apparatus 40C, as illustrated in FIG. 4.

The data collection apparatus 10 starts connection with the terminal apparatus 40D whose priority level is higher than that of the terminal apparatus 40C, and collects data transmitted from the terminal apparatus 40D (step S08). For the connection with the terminal apparatus 40D, for example, standards such as Wi-Fi, Bluetooth®, or the like are used. Steps S05 to S08 are examples of control steps.

As described above, in this exemplary embodiment, the data collection apparatus 10 is able to cope with connection with the terminal apparatus 40D more flexibly than a configuration in which connection with an additional terminal apparatus is not established in the case where the number of terminal apparatuses 40 that are able to be connected with the data collection apparatus 10 has reached an upper limit.

Second Exemplary Embodiment

Figure 8:
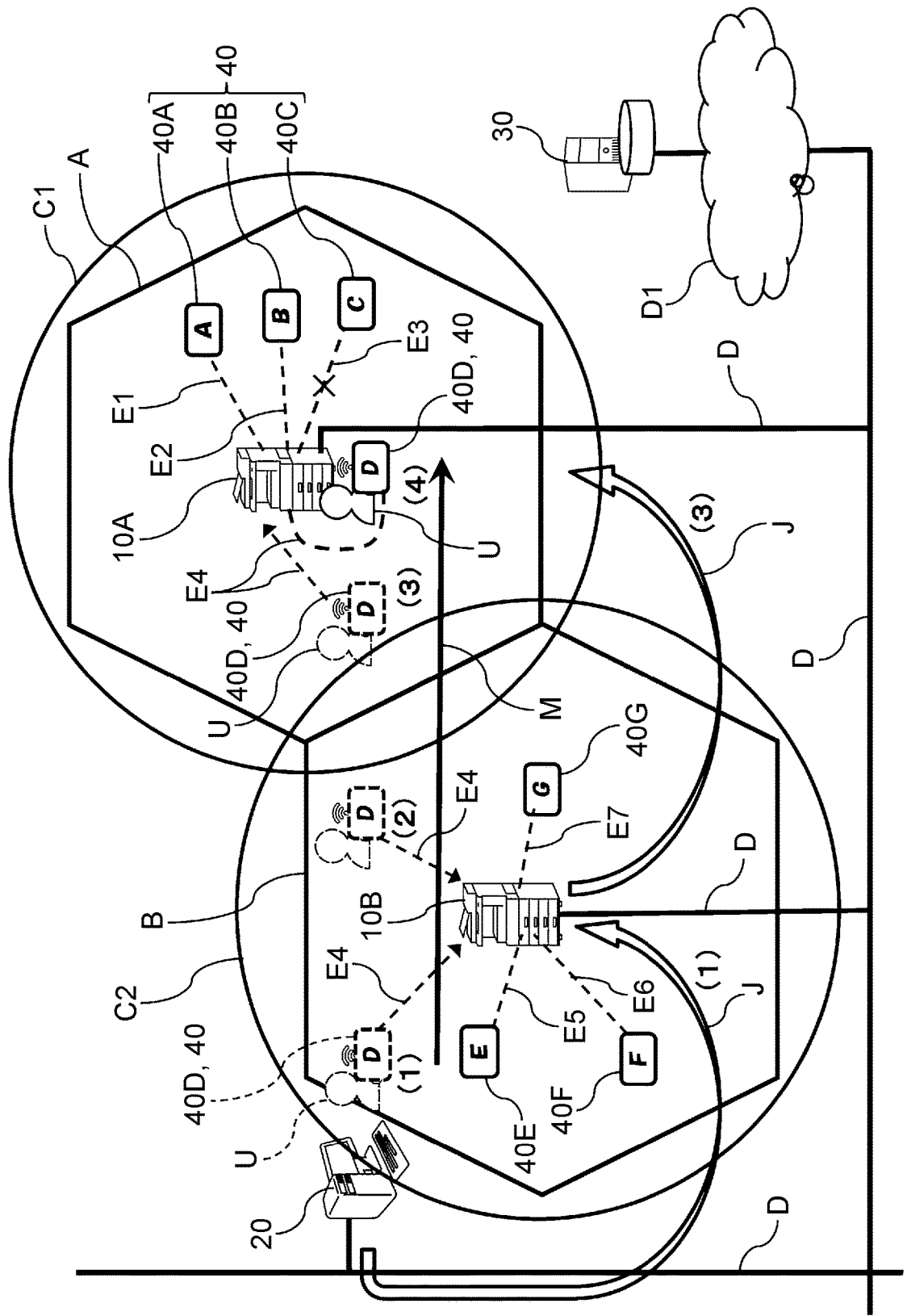
FIG. 8 is a schematic diagram illustrating how switching to connection with a terminal apparatus with a higher priority level is performed in a state in which a plurality of data collection apparatuses according to the second exemplary embodiment of the present disclosure are arranged.
Figure 9:
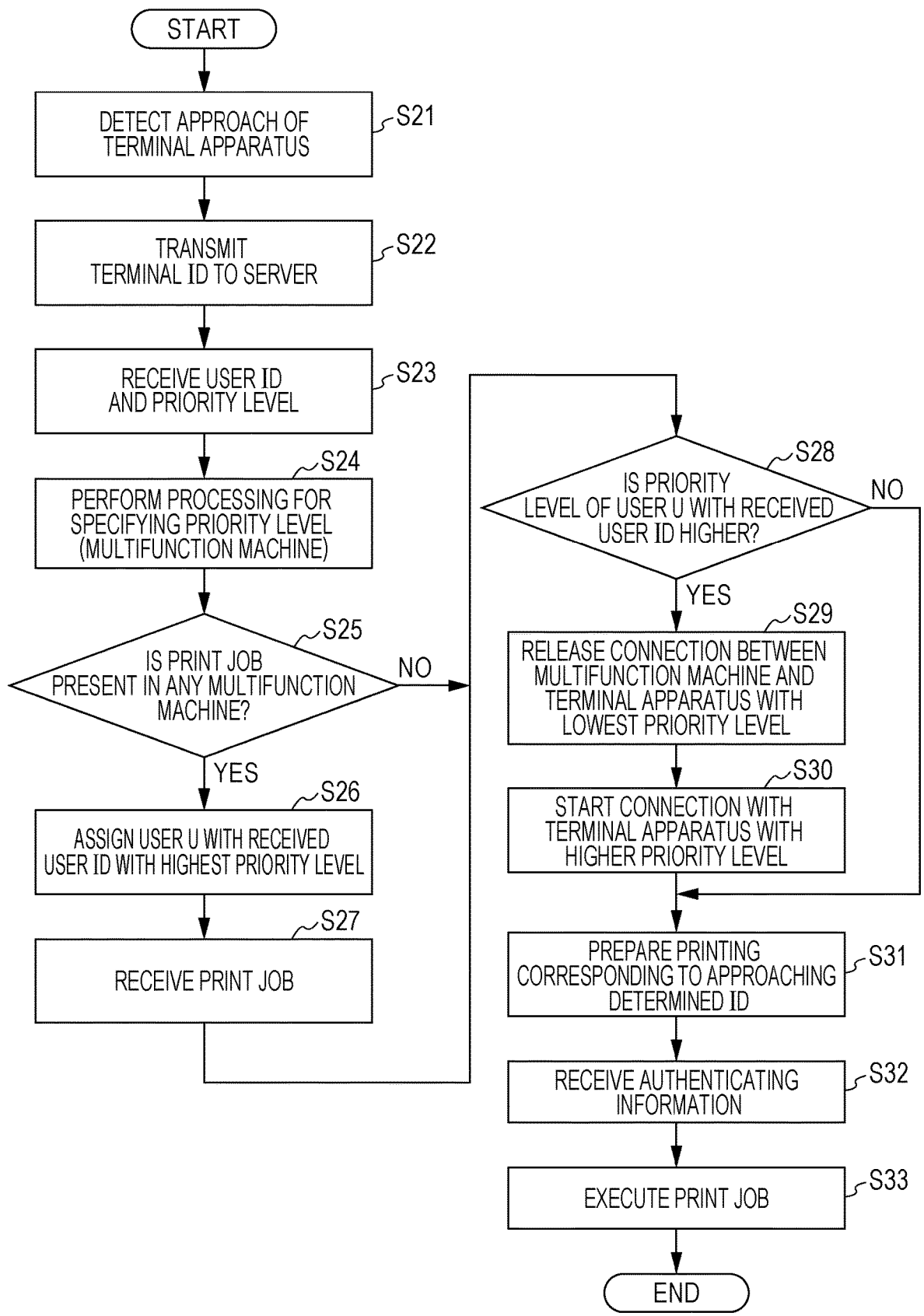
FIG. 9 is a flowchart illustrating an example of a control operation of the data collection apparatus according to the second exemplary embodiment of the present disclosure.

A second exemplary embodiment will be described with reference to FIGS. 8 and 9. FIG. 8 is a schematic diagram illustrating how switching to connection with a terminal apparatus with a higher priority level is performed in a state in which a plurality of data collection apparatuses according to the second exemplary embodiment of the present disclosure are arranged. FIG. 9 is a flowchart illustrating an example of a control operation of the data collection apparatus according to the second exemplary embodiment of the present disclosure. In the second exemplary embodiment, two configurations according to the first exemplary embodiment are provided in adjacent to each other. That is, an area A and an area B are set in adjacent to each other. The same configurations as those of the first exemplary embodiment will be referred to with the same signs. Furthermore, the configuration of the area A in the second exemplary embodiment is the same as the configuration of the area A in the first exemplary embodiment with the exception that the data collection apparatus is represented by a multifunction machine 10A and a region where communication radio waves reaches is denoted by C1. Therefore, explanation for the configuration of the area A in the second exemplary embodiment will be omitted. Furthermore, the configuration of the area B is the same as the configuration of the area A in the first exemplary embodiment with the exception that the data collection apparatus in the area B is represented by a multifunction machine 10B and a region where communication radio waves reach is denoted by C2. Therefore, explanation for the configuration of the area B will be omitted. The multifunction machines 10A and 10B are configured such that functions of printing, scanning, telephone, FAX, and the like are integrated together.

[Entire Configuration]

The multifunction machine 10A according to the second exemplary embodiment further includes a receiving unit 104 that receives a print job J for the multifunction machine 10A and an image forming unit that performs an image forming process according to the print job J. Furthermore, when the receiving unit 104 receives the print job J, the controller 102 assigns the terminal apparatus 40 that belongs to the user U associated with the print job J with a higher priority level than the priority levels of the terminal apparatuses 40 that are connected with the connecting unit 101, by the time when the image forming unit performs the image forming process in accordance with the print job J.

The multifunction machine 10A and the multifunction machine 10B are examples of the data collection apparatus 10. The print job J is an example of a processing request or an image forming job. The image forming unit or the image processing unit is an example of a processing unit. The image forming process is an example of a process.

As illustrated in FIG. 8, the area B is arranged adjacent to the area A in the direction opposite the arrow M. In other words, the area B is arranged adjacent to and upstream of the area A in the direction in which the user U moves. The state in which the area A and the area B are adjacent to each other does not necessarily represents a state in which the area A and the area B are in contact with each other. The area A and the area B may be arranged in the vicinity to each other with a space therebetween.

In this exemplary embodiment, specifically, for example, the multifunction machine 10B is installed within the range of area B included in the region C2 where communication radio waves are able to reach, connection through communication being able to be established within the area B, and is connected with the server 30, which is installed outside the range of the region C2, via the communication medium D. The communication medium D may be a wired system within a premises or may be the Internet D1. Furthermore, the communication medium D is configured such that the multifunction machine 10B arranged within the range of the area B and the multifunction machine 10A arranged within the range of the area A are connected with a client terminal 20 (may also be referred to as a user terminal 20), which is an information terminal of the user U, and the server 30.

Furthermore, the multifunction machine 10B has a function for receiving, via the communication medium D, the print job j that has been instructed, using the user terminal 20, by the user who carries the terminal apparatus 40D and holding the print job J. Although not illustrated in FIG. 8, all or part of connection among the user terminal 20, the multifunction machine 10B, the multifunction machine 10A, and the server 30 may be performed by a wired system within the premises, a wireless system, or the Internet D1.

Furthermore, the multifunction machine 10B is an apparatus that performs processing corresponding to the terminal ID of the terminal apparatus 40D carried by the user U and includes a function for being connected with a plurality of terminal apparatuses 40 at the same time. In this exemplary embodiment, for example, three terminal apparatuses 40E, 40F, and 40G are connected with the multifunction machine 10B at the same time. The terminal apparatuses 40E, 40F, and 40G are connected, for example, through WiFi. Furthermore, in FIG. 8, the terminal apparatus 40D carried by the user U is not connected with the multifunction machine 10B at this point in time.

[Operation and Effect of Data Collection Apparatus]

Operation of the multifunction machine 10A according to this exemplary embodiment will be described below with reference to FIGS. 8 and 9.

As illustrated in FIGS. 8 and 9, the multifunction machine 10B installed within the range of the area B receives, via the communication medium D, the print job J instructed by the user terminal 20, as described above. The user ID of the user U is associated with the user terminal 20, and the user ID of the user U is also associated with the print job J transmitted from the user terminal 20.

The user U who carries the terminal apparatus 40D moves in front of the multifunction machine 10B in the direction represented by the arrow M, and the terminal apparatus 40D transmits a beacon. In this state, the user U moves from the position (1) to the position (2) in the area B while carrying the terminal apparatus 40D. In other words, the user U passes by in front of the multifunction machine 10B. At this point in time, the multifunction machine 10B holds the print job J. The print job J may be reserved in advance.

If the user U holds the terminal apparatus 40D over the input unit 15 of the multifunction machine 10B or makes the terminal apparatus 40D in contact with the input unit 15 of the multifunction machine 10B, the terminal apparatus 40D and the multifunction machine 10B communicate with each other. The multifunction machine 10B identifies the terminal apparatus 40D and thus identifies the user U corresponding to the identified terminal apparatus 40D. By this processing, the multifunction machine 10B authenticates that the user who has held the terminal apparatus 40D over the multifunction machine 10B or made the terminal apparatus 40D in contact with the multifunction machine 10B is the user U, and thus prints the print job J corresponding to the terminal ID of the user U. However, in this exemplary embodiment, as described above, the user U passes by the position of the multifunction machine 10B.

Next, the user U who carries the terminal apparatus 40D reaches the position (3) in the area A from the position (2) in the area B.

When the user U enters the range of the area A, the multifunction machine 10A receives the beacon E4 transmitted from the terminal apparatus 40D and detects approach of the terminal apparatus 40D (step S21). In other words, the multifunction machine 10A detects a change in the radio wave intensity of the beacon E4 from the terminal apparatus 40D, that is, detects a gradual increase in the radio wave intensity, and thus detects an approaching state of the terminal apparatus 40D. In this state, the three terminal apparatuses 40A, 40B, and 40C are connected with the connecting unit 101 of the multifunction machine 10A. In this exemplary embodiment, for example, the number of terminal apparatuses 40 that are able to be connected with the multifunction machine 10A is set in advance to three. That is, the multifunction machine 10A detects that the terminal apparatus 40D is in the approaching state, which is beyond the upper limit of the number of apparatuses that are able to be connected with the multifunction machine 10A.

To determine the priority level of the terminal apparatus 40 that is in the approaching state, the multifunction machine 10A transmits the terminal ID transmitted from the terminal apparatus 40 to the server 30 (step S22).

A database, which is not illustrated in FIG. 8, in which the terminal IDs of the terminal apparatuses 40 and the user IDs of the users U are stored in association with each other, is stored in the server 30, and the server 30 identifies the user ID of the user U based on the received terminal ID. Furthermore, in this exemplary embodiment, for example, the server 30 includes the priority level determination table 31 illustrated in FIG. 5 and the priority level assignment table 32 illustrated in FIG. 6. The server 30 identifies the priority level of the user U, based on a priority level coefficient weighted on the user U stored in the priority level assignment table (see FIG. 6), according to a value obtained by multiplication of each priority level coefficient in the priority level determination table 31 (see FIG. 5). In this exemplary embodiment, in FIGS. 5 and 6, information in service fields shaded with dots is used. Priority level coefficients set in the priority level assignment table 32 may be changed dynamically.

The multifunction machine 10A receives the priority level, along with the user ID of the user U, and stores the received user ID and the priority level (step S23). The priority level is transmitted, as the value of the priority level (hereinafter, may be simply referred to as a "priority level") calculated in the server 30, in association with the user ID.

The multifunction machine 10A identifies the priority level of the user U of the terminal apparatus 40D that has transmitted the beacon received by the receiving unit 104 and the priority levels associated with the user IDs of the users U associated with the terminal apparatuses 40A, 40B, and 40C that are connected with the multifunction machine 10A at the point in time (step S24). The priority levels associated with the user IDs of the users U associated with the terminal apparatuses 40A, 40B, and 40C that are connected with the multifunction machine 10A are stored in advance in the storage 14 of the multifunction machine 10A. The multifunction machine 10A reads the priority levels of the users U of the terminal apparatuses 40A, 40B, and 40C that are connected with the multifunction machine 10A to identify the priority levels of the users U of the terminal apparatuses 40A, 40B, and 40C.

Furthermore, the multifunction machine 10A determines whether or not the print job J of the user U is held in any one of multifunction machines in the network including the multifunction machine 10A (step S25). The multifunction machine 10A confirms the queue of the print job J stored in the storage 14 of the multifunction machine 10A and asks each of the other multifunction machines connected with the network as to whether or not the multifunction machine holds the print job J associated with the user ID received in step S23. Alternatively, the multifunction machine 10A asks a print server that manages print jobs, which is not illustrated in FIG. 8, as to whether or not there is a multifunction machine that holds the print job associated with the user ID received in step S23.

In the case where there is no multifunction machine that holds the print job J for the user U (step S25: NO), the multifunction machine 10A proceeds to step S27. In the case where there is a multifunction machine that holds the print job J for the user U (step S25: YES), the multifunction machine 10A proceeds to step S26.

The multifunction machine 10A assigns the user U with the user ID received in step S22, that is, the user U of the terminal apparatus 40D, with the highest priority level (step S26).

In this case, the print job J is present in the multifunction machine 10B, and therefore, the multifunction machine 10A receives the print job J from the multifunction machine 10B (step S27).

The multifunction machine 10A compares the priority level of the user U of the terminal apparatus 40D with the priority levels of the users U of the terminal apparatuses 40A, 40B, and 40C that are connected with the multifunction machine 10A to determine whether or not the priority level of the user U with the user ID received in step S22 is higher than the priority levels of the users U of the terminal apparatuses 40A, 40B, and 40C (step S28).

In the case where the priority level of the user U of the terminal apparatus 40D is lower than all the priority levels of the users of the terminal apparatuses 40A, 40B, and 40C that are connected with the multifunction machine 10A (step S28: NO), the multifunction machine 10A does not establish connection with the terminal apparatus 40D, and the data collection process ends.

In contrast, in the case where the priority level of the user U of the terminal apparatus 40D is equal to or higher than any one of the priority levels of the users of the terminal apparatuses 40A, 40B, and 40C that are connected with the multifunction machine 10A (step S28: YES), the multifunction machine 10A proceeds to step S28.

The multifunction machine 10A releases connection with the terminal apparatus of the user U with the lowest priority level among the users U of the terminal apparatuses 40A, 40B, and 40C (step S29). In this exemplary embodiment, for example, the priority level of the user of the terminal apparatus 40C is the lowest. Therefore, as represented by a cross sign in FIG. 8, the multifunction machine 10A releases the connection with the terminal apparatus 40C.

The multifunction machine 10A starts connection with the terminal apparatus 40D whose priority level is higher than that of the terminal apparatus 40C, and collects data transmitted from the terminal apparatus 40D (step S30). For the connection with the terminal apparatus 40D, for example, standards such as Wi-Fi, Bluetooth, or the like are used.

Next, the multifunction machine 10A prepares processing corresponding to the user ID of the user U who carries the terminal apparatus 40D. In this exemplary embodiment, for example, processing for printing the print job J corresponding to the user ID of the user U is prepared (step S31). For this processing, for example, the multifunction machine 10A starts warming up of an image forming unit, which is not illustrated in FIG. 8. Furthermore, in the case where the print job J is held in another multifunction machine connected with the network, the multifunction machine 10A acquires data of the print job from the multifunction machine that holds the print job J. The processing of steps S31 to S33 is omitted in the case where it is determined in step S25 that there is no multifunction machine that holds the print job J.

Then, the multifunction machine 10A receives authenticating information from the user U who carries the terminal apparatus 40D (step S32). In this exemplary embodiment, for example, when the terminal apparatus 40D is held over the input unit 15 of the multifunction machine 10A or made in contact with the input unit 15 of the multifunction machine 10A at a position (4), the multifunction machine 10A acquires, as authenticating information, one or both of the user ID of the user U and the terminal ID of the terminal apparatus 40D corresponding to the user ID. At least one of the user ID of the user U and the terminal ID of the terminal apparatus 40D acquired is authenticated, for example, by being transmitted to an authenticating server.

When authentication is successfully completed, the multifunction machine 10A executes the print job (step S33).

As described above, in this exemplary embodiment, the multifunction machine 10A further includes the receiving unit 104 that receives the print job J as a processing request for the multifunction machine 10A and the image forming unit as a processing unit that forms an image in accordance with the print job J. When the receiving unit 104 receives the print job J, the controller 102 assigns a terminal apparatus that belongs to a user who is associated with the print job J with a higher priority level than the priority levels of terminal apparatuses that are connected with the connecting unit 101, by the time when the image forming unit performs, as a process, image formation in accordance with the print job J.

Accordingly, compared to the configuration in which the priority level of a terminal apparatus is not considered, connection between the data collection apparatus and each of a plurality of terminal apparatuses is switched according to the priority level of the terminal apparatus, and the processing of a print job is performed. In other words, the terminal apparatus 40D of the user U who has issued the instruction for the print job J is able to be easily connected with the multifunction machine 10A as the data collection apparatus.

Furthermore, in the case where the number of terminal apparatuses that are present in the region is larger than a limited number and there is the print job J associated with the user of the terminal apparatus 40D that is not connected with the connecting unit 101 in the region, the priority level of the terminal apparatus 40D that is not connected with the connecting unit 101 is increased.

Accordingly, connection with an additional terminal apparatus is coped with more flexibly than a configuration in which connection with an additional terminal apparatus is not established in the case where the number of connected terminal apparatuses has reached the upper limit, and processing for the print job is performed.

Specific exemplary embodiments of the present disclosure have been described above in detail. However, the present disclosure is not limited to any exemplary embodiment. It is obvious to those skilled in the art that other various exemplary embodiments may be made within the scope of the present disclosure.

For example, the process described above may also be performed by a dedicated hardware circuit. In this case, the process may be performed by a single piece of hardware or a plurality of pieces of hardware.

A program that causes the data collection apparatus 10 to operate may be provided by a computer-readable recording medium such as a universal serial bus (USB) memory, a flexible disk, or a compact disc-read only memory (CD-ROM) or may be provided online via a network such as the Internet. In this case, the program recorded in the computer-readable recording medium is usually transferred and stored into a memory, a storage, or the like. Furthermore, for example, this program may be provided as a single piece of application software or may be incorporated into software of each apparatus as a function of the data collection apparatus 10.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A data collection apparatus comprising:
   a communicator connecting the data collection apparatus with a limited number of terminal apparatuses;
   a memory that stores priority levels regarding connection with the terminal apparatuses; and
   a controller that allows, in a case where a number of terminal apparatuses that are present in a region in which the data collection apparatus is able to be connected through communication with a terminal apparatus via the communicator is larger than the limited number, a terminal apparatus that enters the region from a location outside of the region, is not connected through communication with the communicator, and has a higher priority level to be connected with the communicator, in place of a terminal apparatus that has already been connected through communication with the communicator and has a lower priority level, in accordance with the stored priority levels, the priority levels being priority levels of respective users associated with respective ones of the terminal apparatuses.

2. The data collection apparatus according to claim 1, further comprising:
a data transmitter that transmits data acquired from the terminal apparatus that is connected via the connecting unit to an external server.

3. The data collection apparatus according to claim 2, wherein the controller asks the server about the priority levels of the terminal apparatuses to acquire the priority levels of the terminal apparatuses.

4. The data collection apparatus according to claim 3, further comprising:
a receiver that receives a processing request to the data collection apparatus; and
a processor configured to perform a process according to the processing request,
wherein when the receiver receives the processing request, the controller assigns a terminal apparatus that belongs to a user associated with the processing request with a higher priority level than a priority level of the terminal apparatus that is connected with the communicator, by a time when the process is performed by the processing unit in accordance with the processing request.

5. The data collection apparatus according to claim 4, wherein in a case where the number of terminal apparatuses that are present in the region is larger than the limited number and a processing request associated with a user to which a terminal apparatus that is not connected with the communicator belongs is present in the region, the controller increases the priority level of the terminal apparatus that is not connected with the communicator.

6. The data collection apparatus according to claim 2, further comprising:
a receiver that receives a processing request to the data collection apparatus; and
a processor configured to perform a process according to the processing request,
wherein when the receiver receives the processing request, the controller assigns a terminal apparatus that belongs to a user associated with the processing request with a higher priority level than a priority level of the terminal apparatus that is connected with the communicator, by a time when the process is performed by the processing unit in accordance with the processing request.

7. The data collection apparatus according to claim 6, wherein in a case where the number of terminal apparatuses that are present in the region is larger than the limited number and a processing request associated with a user to which a terminal apparatus that is not connected with the communicator belongs is present in the region, the controller increases the priority level of the terminal apparatus that is not connected with the communicator.

8. The data collection apparatus according to claim 7, wherein the processing request includes reservation for the process by the processor.

9. The data collection apparatus according to claim 7, wherein the processing request is an image forming job for making a request for image processing, and
wherein the processor is an image processor that performs image processing in accordance with the image forming job.

10. The data collection apparatus according to claim 6, wherein the processing request includes reservation for the process by the processor.

11. The data collection apparatus according to claim 6, wherein the processing request is an image forming job for making a request for image processing, and
wherein the processor is an image processor that performs image processing in accordance with the image forming job.

12. The data collection apparatus according to claim 1, further comprising:
a receiver that receives a processing request to the data collection apparatus; and
a processor configured to perform a process according to the processing request,
wherein when the receiver receives the processing request, the controller assigns a terminal apparatus that belongs to a user associated with the processing request with a higher priority level than a priority level of the terminal apparatus that is connected with the communicator, by a time when the process is performed by the processing unit in accordance with the processing request.

13. The data collection apparatus according to claim 12, wherein in a case where the number of terminal apparatuses that are present in the region is larger than the limited number and a processing request associated with a user to which a terminal apparatus that is not connected with the communicator belongs is present in the region, the controller increases the priority level of the terminal apparatus that is not connected with the communicator.

14. The data collection apparatus according to claim 13, wherein the processing request includes reservation for the process by the processor.

15. The data collection apparatus according to claim 13, wherein the processing request is an image forming job for making a request for image processing, and
wherein the processor is an image processor that performs image processing in accordance with the image forming job.

16. The data collection apparatus according to claim 12, wherein the processing request includes reservation for the process by the processor.

17. The data collection apparatus according to claim 16, wherein the processing request is an image forming job for making a request for image processing, and
wherein the processor is an image processor that performs image processing in accordance with the image forming job.

18. The data collection apparatus according to claim 12, wherein the processing request is an image forming job for making a request for image processing, and
wherein the processor is an image processor that performs image processing in accordance with the image forming job.

19. A non-transitory computer readable medium storing a program causing a computer to execute a process for data collection, the process comprising:

establishing connection through communication with a limited number of terminal apparatuses via a connecting unit;

storing priority levels regarding connection with the terminal apparatuses with which connection through communication has been established; and allowing, in a case where the number of the terminal apparatuses with which connection through communication has been established in a region in which connection through communication with the terminal apparatuses via the connecting unit is possible is larger than the limited number, connection through communication with a terminal apparatus that enters the region from a location outside of the region, with which connection through communication has not been established, and has a higher priority level to be established, in place of a terminal apparatus with which connection through communication has already been established and has a lower priority level, in accordance with the priority levels, the priority levels being priority levels of respective users associated with respective ones of the terminal apparatuses.

20. A data collection apparatus comprising:

connecting means for being able to be connected through communication with a limited number of terminal apparatuses;

storing means for storing priority levels regarding connection with the terminal apparatuses; and control means for allowing, in a case where the number of terminal apparatuses that are present in a region in which the data collection apparatus is able to be connected through communication with a terminal apparatus via the connecting means is larger than the limited number, a terminal apparatus that enters the region from a location outside of the region, is not connected through communication with the connecting means, and has a higher priority level to be connected with the connecting means, in place of a terminal apparatus that has already been connected through communication with the connecting means and has a lower priority level, in accordance with the stored priority levels, the priority levels being priority levels of respective users associated with respective ones of the terminal apparatuses.

\* \* \* \* \*